United States Patent Office 3,083,189
Patented Mar. 26, 1963

3,083,189
CROSS-LINKED OLEFIN-MALEIC ANHYDRIDE INTERPOLYMERS
Raymond H. Reinhard, Galveston, Tex., assignor to Monsanto Chemical Company, St. Louis, Mo., a corporation of Delaware
No Drawing. Filed Nov. 21, 1960, Ser. No. 70,394
16 Claims. (Cl. 260—78.5)

The present invention relates to cross-linked interpolymers of $C_2$–$C_4$ olefins with 1,2-dicarboxylic acids or their anhydrides and salts of said interpolymers.

Many cross-linking agents have been disclosed for use in the production of interpolymers from carboxylic monomers and olefinic compounds. A list of a number of suitable compounds for use in cross-linking styrene-maleic anhydride copolymers, for example, has been given in U.S. Patent 2,647,886. While it might be expected that such agents as are disclosed for styrene-containing polymers should be equally suitable for cross-linking olefin-containing polymers such as ethylene-maleic anhydride copolymers, this has not proven to be the case. Divinylbenzene, for example, which is an excellent cross-linking agent for styrene-maleic anhydride comonomers as demonstrated in the aforementioned patent, gives no appreciable cross-linking with either ethylene and maleic anhydride or propylene and maleic anhydride copolymers. Ethylene glycol dimethacrylate likewise does not cross-link the polymers with which the present invention is concerned whereas it is also disclosed as being an effective cross-linking agent for styrene-maleic anhydride copolymers.

Even in instances where some cross-linking can be effected by certain of the cross-linking agents known to be suitable in other systems, the resulting polymer product is not useful in a given application. Cross-linked polymers of olefins such as ethylene, propylene and the like with maleic anhydride, for example, find extensive use when dispersed in water as viscosity control agents in the formation of various mucilaginous or colloidal gel compositions. They act as bodying or thickening agents in the preparation of textile printing pastes, surgical jellies, creams and ointments and the like. Such interpolymers generally in the form of gels must be hydrolytically stable, however, so that their viscosity does not decrease upon standing or else they are useless in these particular applications. Many of the known cross-linking agents are deficient because they result in interpolymers which are unstable products, i.e., products which have the serious disadvantage of being readily hydrolyzed in water particularly in the presence of alkalies such as are usually present in the mixtures in which they are useful. Such hydrolysis results in solution of the interpolymers upon standing with a steady breakdown in viscosity even to the extent that the final solution is about the equivalent of the unmodified copolymer.

It is the primary object of the present invention, therefore, to produce cross-linked interpolymers of $C_2$–$C_4$ olefins and maleic anhydride which are hydrolytically stable and which by virtue of this stability are eminently useful as viscosity control agents.

This and other objects and advantages of the invention which will become apparent from the following description are achieved by reacting $C_2$–$C_4$ olefins with 1,2-dicarboxylic acids or their anhydrides in the presence of an α,ω-diolefin or diene having from 7 to 22 carbon atoms as a cross-linking agent. The dicarboxylic acids can be maleic acid, fumaric acid, the mono- or dichlorosubstituted maleic and fumaric acids, alkylated maleic and fumaric acids, mono- and diphenyl maleic acids, benzyl maleic acid, dibenzyl maleic acid, ethyl maleic acid or any similar acids containing a double bond in the chain between the carboxyl groups such as mesaconic and citraconic acids. Acids where the double bond has shifted from the 1,2-position such as itaconic and glutaconic acids can also be used. Preferably, however, the anhydride of each of the above-mentioned acids capable of anhydride formation is employed rather than the acids.

More specifically, the interpolymers of the invention are formed by polymerizing a monomeric mixture of maleic anhydride and a $C_2$–$C_4$ olefin, i.e., ethylene, propylene, n-butylene and isobutylene, or a mixture of such olefins using an α,ω-diene having from 7–22 carbon atoms as a cross-linking agent. The dienes which can be employed as cross-linking agents include such compounds as heptadiene-1,6, octadiene-1,7, nonadiene-1,8, decadiene-1,9, undecadiene-1,10, dodecadiene-1,11, tridecadiene-1,12, tetradecadiene-1,13, pentadecadiene-1,14, heptadecadiene-1,16, nonadecadiene-1,18, eicosadiene-1,19, docosadiene-1,21 and the like.

The amount of diene employed depends to some extent upon the olefin employed but generally lies in the range from about 1 to about 10% by weight of the total polymerizable mixture. When ethylene is a comonomer, for example, the amount of cross-linking diene used should not exceed about 5% in order that the interpolymer produced will have the required viscosity when dispersed in water to function as a thickener or viscosity control agent. With the higher olefins, the amount of cross-linking agent can be increased up to the 10% level of desired.

The polymerization is carried out in an inert organic solvent, preferably a non-polymerizing hydrocarbon solvent, having solvating action on both the monomers and the cross-linking agent but which has little appreciable solvent or swelling action on the cross-linked interpolymer produced. In this way, the polymer is obtained in the form of a fine powder which only requires freeing from solvent before use. Suitable solvents include, for example, ethylene dichloride, ethylacetate, dioxane and, particularly, aromatic hydrocarbons such as benzene, toluene and xylene.

The olefin and anhydride are ordinarily charged in the equimolar proportions in which they react although variations can be made in the actual proportions used. The monomers and cross-linking agent are preferably dissolved in an amount of solvent such that the solids content of the reaction slurry formed is about 10%–18% depending on the density of the solvent employed. This ordinarily represents an amount of solvent about six times the total weight of the compounds to be polymerized. The amount of solvent is not critical, however, and proportions of solvent as much as 10 to 20 times the weight of the olefin and maleic anhydride may be used. Alternatively, the diene cross-linking agent may be added to the mixture of anhydride and olefin during the course of the polymerization either over part or all of the polymerization period. The resulting solution is mixed thoroughly and heated sufficiently so that the polymerization reaction takes place.

An organic solvent-soluble catalyst is necessary. Any of the organic free-radical catalysts is satisfactory. Among these are various organic solvent-soluble peroxygen compounds including benzoyl peroxide, caprylyl peroxide, acetyl peroxide, acetyl benzoyl peroxide, di-tert-butyl peroxide and others, azoisobutyronitrile, dimethyl azoisobutyrate and many others. Mixtures of such catalysts are also suitable in the polymerization process of the invention. Radiation polymerization can be used, too, e.g., such high energy radiation sources as X-rays, γ-rays, neutrons and the like can be used to initiate polymerization.

The polymerization can be carried out at a temperature within the range from 0° C. to 100° C. with optimum temperatures varying with the particular $C_2-C_4$ olefin employed. Preferred temperatures lie for the most part in the range from 40° C. to 80° C. Pressure may vary from atmospheric to about 600 p.s.i.g. or higher depending upon the particular olefin used.

At the completion of the polymerization reaction, the interpolymer is recovered from the organic solvent by any suitable means. While the interpolymers may be used in the anhydride form, they are more commonly employed as viscosity control agents in the form of their alkali metal or ammonium salts which form dilute swollen gels or dispersions in aqueous medium. This conversion is generally effected by solution in the appropriate aqueous hydroxide. Alkali metal or ammonium salts of the interpolymers such as sodium, potassium, lithium, rubidium and caesium salts may be obtained by reacting the interpolymers with the stoichiometric amount of the corresponding hydroxide. Partial salts may, of course, be produced by using less than the quantity of alkali required to effect complete conversion of the carboxyl groups. When polymeric anhydrides are reacted with anhydrous ammonia, an appreciable amount of amide groups are formed resulting in mixed ammonium-amide polymeric salts.

The following specific examples, which are intended as illustrative only, will more clearly demonstrate the preparation of the hydrolysis-resistant interpolymers of maleic anhydride and $C_2-C_4$ olefins using α,ω-dienes as the cross-linking agents. All parts given are by weight.

EXAMPLE 1

A one-gallon autoclave fitted with a paddle stirrer and pressure control means was employed as the polymerization reactor. After it had been completely dried and freed of air, a mixture of 181.5 parts of maleic anhydride dissolved in 2100 parts of benzene was charged to the reactor and heated to a temperature of about 70° C. To this solution was added 7.2 parts of benzoyl peroxide and 5.0 parts of hexadecadiene-1,15. The reactor was then charged with sufficient ethylene to give a pressure at reaction temperature (70° C.) of approximately 600 p.s.i.g. The contents of the reactor were continuously agitated during the addition of the ethylene and throughout the entire reaction period. Additional ethylene was charged periodically to maintain the pressure at 600 p.s.i.g. The reaction was continued until the samples withdrawn at intervals and titrated with sodium hydroxide indicated that 98+% of the anhydride had been reacted (6 hr.). At that point, unreacted ethylene was vented from the reactor, the reaction mixture was cooled and filtered, and the separated interpolymer was washed with benzene and dried.

A sample of the polymer was added to sufficient water containing ammonium hydroxide to make up a 1% concentration of the polymer in water, sufficient ammonium hydroxide having been added (pH ~10) to neutralize the interpolymer and to form substantially the diammonium salt of the polymer. The viscosity of the resulting gel was determined with a Brookfield viscosimeter using a number 6 spindle at 5 r.p.m. and found to be 66,500 centipoises at room temperature (about 25° C.).

EXAMPLE 2

A series of polymerization runs substantially identical to that in Example 1 were made except that various α,ω-dienes were used in varying concentrations as the cross-linking agents. In a similar manner to that described in Example 1, 1% solutions of the ammonium salts of the interpolymers in water were prepared and the viscosity of each of the resulting aqueous gels was determined using a Brookfield Model RVT viscosimeter. Results are tabulated below.

*Table I*

| Polymer No. | Cross-linking Agent | Amount, Percent by Wt. | Viscosity | | |
|---|---|---|---|---|---|
| | | | Spindle No. | R.p.m. | Centipoises |
| 248 | Heptadiene-1, 6 | 1.0 | 1 | 5 | 332 |
| 245 | ----do---- | 2.0 | 4 | 5 | 5,280 |
| 247 | ----do---- | 4.0 | 7 | 5 | 108,800 |
| 239 | Octadiene-1, 7 | 2.0 | 6 | 5 | 59,000 |
| 249 | ----do---- | 2.9 | 7 | 5 | 120,000 |
| 240 | Undecadiene-1, 10 | 2.0 | 6 | 5 | 42,000 |
| 244 | Tetradecadiene-1, 13. | 2.0 | 5 | 5 | 32,480 |
| 255 | ----do---- | 3.25 | 7 | 5 | 176,000 |
| 256 | Hexadecadiene-1, 15 | 2.0 | 7 | 5 | 130,400 |
| 258 | ----do---- | 3.25 | 7 | 5 | 200,000 |
| 241 | Docosadiene-1, 21 | 2.0 | 5 | 5 | 5,840 |
| 251 | ----do---- | 4.0 | 7 | 5 | 104,000 |

EXAMPLE 3

The experiment of Example 1 was repeated using a polymerization temperature of 45° C. and 3.8 g. of isopropylperoxydicarbonate as the initiator instead of benzoyl peroxide. The viscosity of a 1% dispersion of the ammonium salt of this interpolymer in water as determined with a number 4 spindle on a Brookfield viscosimeter, Model RVT, at 6 r.p.m. was 5,500 centipoises.

EXAMPLE 4

Following essentially the same procedure as outlined in Example 1, propylene was continuously charged to the polymerization reactor containing 2100 parts of benzene, 367.5 parts of maleic anhydride, 3.87 parts of isopropylperoxydicarbonate and 21 parts of heptadiene-1,6 to maintain a pressure of 40 lb. per sq. in. until substantially all of the maleic anhydride had been reacted. The temperature throughout the reaction period was maintained at about 50° C. The cross-linked interpolymer produced was recovered and converted to its ammonium salt form as described in Example 1. The viscosity of the resulting aqueous gel of 1% concentration as determined with a Brookfield viscosimeter using a No. 6 spindle at 5 r.p.m. was 32,000 centipoises at room temperature (~25° C.).

EXAMPLE 5

The stability of a number of aqueous gel dispersions of the interpolymers of Example 2 was determined as follows: The interpolymer was ground in a mortar after which 4 g. of the polymer was added to 390 ml. of dionized water and the mixture was agitated thoroughly in a Hamilton Beach mixer with 10 cc. of sodium hydroxide solution (166 g./liter) being added during mixing. The initial viscosity of the resulting gel of the sodium salt of the interpolymer (pH 7-8) was then determined. The gel was then stored at a temperature of about 82.5° C. over an extended period of time with viscosity determinations being made at various intervals during the storage period. A Brookfield viscosimeter, Model RVT, was employed with a No. 7 spindle at 5 r.p.m. at 25° C. Results of these determinations are presented in Table II below for all the samples tested. Polymer numbers used here correspond to those in Table I of Example 2. Included for comparative purposes are similar data for an aqueous dispersion of the same sodium salt form of an interpolymer of ethylene, maleic anhydride and vinyl crotonate, the latter compound being a well-known cross-linking agent. This is identified as the control sample. The data illustrate conclusively the superior resistance to hydrolysis exhibited by dispersions of the interpolymers of the invention. This characteristic makes these interpolymers highly desirable as thickening agents in many compositions.

Table II

| Polymer No. | Viscosity (Centipoises) | | | | | |
|---|---|---|---|---|---|---|
| | Initial | 24 hr. | 72 hr. | 168 hr. | 228 hr. | 504 hr. |
| 247 | 80,000 | 83,000 | 80,000 | 77,000 | 76,000 | 60,000 |
| 249 | 120,000 | 124,000 | 124,000 | 92,000 | 92,000 | 104,000 |
| 251 | 80,000 | 76,000 | 80,000 | 56,000 | 56,000 | 56,000 |
| 255 | 120,000 | 116,000 | 116,000 | 76,000 | 80,000 | 80,000 |
| 258 | 110,000 | 136,000 | 128,000 | 108,000 | 108,000 | 120,000 |
| Control | 100,000 | 35,000 | 28,000 | 620 | 1,000 | 30 |

What is claimed is:

1. A cross-linked interpolymer comprising substantially equimolar proportions of maleic anhydride and an olefin having from 2–4 carbon atoms and an $\alpha,\omega$-diolefin having from 7 to 22 carbon atoms in an amount in the range from about 1% to about 10% by weight based on the reacting monomers.

2. A salt chosen from the group consisting of the alkali metal and ammonium salts of a cross-linked interpolymer comprising substantially equimolar proportions of maleic anhydride and an olefin having from 2–4 carbon atoms and an $\alpha,\omega$-diolefin having from 7 to 22 carbon atoms in an amount in the range from about 1% to about 10% by weight based on the reacting monomers.

3. A cross-linked interpolymer comprising substantially equimolar proportions of maleic anhydride and ethylene and from about 1% to about 5% by weight based on reacting monomers of an $\alpha,\omega$-diolefin having from 7 to 22 carbon atoms.

4. A salt chosen from the group consisting of the alkali metal and ammonium salts of a cross-linked interpolymer comprising substantially equimolar proportions of maleic anhydride and ethylene and from about 1% to about 5% by weight based on reacting monomers of an $\alpha,\omega$-diolefin having from 7 to 22 carbon atoms.

5. A cross-linked interpolymer comprising substantially equimolar proportions of maleic anhydride and propylene and from about 1% to about 10% by weight based on the reacting monomers of an $\alpha,\omega$-diolefin having from 7–22 carbon atoms.

6. A salt chosen from the group consisting of the alkali metal and ammonium salts of a cross-linked interpolymer comprising substantially equimolar proportions of maleic anhydride and propylene and from about 1% to about 10% by weight based on the reacting monomers of an $\alpha,\omega$-diolefin having from 7 to 22 carbon atoms.

7. A cross-linked interpolymer comprising substantially equimolar proportions of maleic anhydride and ethylene and from about 1% to about 5% by weight of heptadiene-1,6.

8. A salt of the interpolymer of claim 7 chosen from the group consisting of the alkali metal and ammonium salts of said interpolymer.

9. A cross-linked interpolymer comprising substantially equimolar proportions of maleic anhydride and ethylene and from about 1% to about 5% by weight of octadiene-1,7.

10. A salt of the interpolymer of claim 9 chosen from the group consisting of the alkali metal and ammonium salts of said interpolymer.

11. A cross-linked interpolymer comprising substantially equimolar proportions of maleic anhydride and ethylene and from about 1% to about 5% by weight of tetradecadiene-1,13.

12. A salt of the interpolymer of claim 11 chosen from the group consisting of the alkali metal and ammonium salts of said interpolymer.

13. A cross-linked interpolymer comprising substantially equimolar proportions of maleic anhydride and ethylene and from about 1% to about 5% by weight of hexadecadiene-1,15.

14. A salt of the interpolymer of claim 13 chosen from the group consisting of the alkali metal and ammonium salts of said interpolymer.

15. A cross-linked interpolymer comprising substantially equimolar proportions of maleic anhydride and propylene and from about 1% to about 10% of heptadiene-1,6.

16. A salt of the interpolymer of claim 15 chosen from the group consisting of the alkali metal and ammonium salts of said interpolymer.

References Cited in the file of this patent

UNITED STATES PATENTS 2,810,716    Markus  ---------------- Oct. 22, 1957
2,923,692    Ackerman et al. ---------- Feb. 2, 1960